United States Patent
Chapman et al.

(10) Patent No.: US 6,175,603 B1
(45) Date of Patent: Jan. 16, 2001

(54) SYSTEM FOR MANAGING SIGNALS IN DIFFERENT CLOCK DOMAINS AND A PROGRAMMABLE DIGITAL FILTER

(75) Inventors: John T. Chapman, Cupertino; Daniel W. Crocker, San Jose; Bruce Y. Chen, Palo Alto, all of CA (US)

(73) Assignee: Cisco Technology, Inc., San Jose, CA (US)

( * ) Notice: Under 35 U.S.C. 154(b), the term of this patent shall be extended for 0 days.

(21) Appl. No.: 08/908,278

(22) Filed: Aug. 7, 1997

(51) Int. Cl.[7] ............................................. H04L 7/00
(52) U.S. Cl. ..................... 375/354; 375/362; 327/142; 327/144; 327/146
(58) Field of Search ..................... 375/354, 355, 375/357, 362; 327/34, 141, 142, 144, 146, 150, 176; 341/50, 61; 329/363; 345/88, 132, 152, 508

(56) References Cited

U.S. PATENT DOCUMENTS

| | | | |
|---|---|---|---|
| 4,439,762 | * 3/1984 | Van Vliet et al. | 345/508 |
| 4,769,613 | * 9/1988 | Sawata et al. | 329/363 |
| 5,059,925 | 10/1991 | Weisbloom | 331/1 A |
| 5,225,715 | * 7/1993 | Mori et al. | 327/34 |
| 5,255,291 | 10/1993 | Holden et al. | 375/362 |
| 5,300,944 | * 4/1994 | Shapiro et al. | 345/88 |
| 5,821,884 | * 10/1998 | Lee | 341/61 |

* cited by examiner

Primary Examiner—Stephen Chin
Assistant Examiner—Chieh M. Fan
(74) Attorney, Agent, or Firm—Marger Johnson & McCollom, P.C.

(57) ABSTRACT

A synchronizer circuit manages signals in different clock domains by generating clock pulses synchronized with a system clock. The clock pulses are generated at a rate proportional to the frequency of a clock operating in a first clock domain. Digital circuitry is then driven at the frequency of the first clock and in the time domain of the system clock. A hand-shaking protocol prevents the synchronizer circuit from going into a metastable condition when passing clock or data signals into different time domains. A programmable digital filter includes multiple sampling stages that sample an input signal. A detection circuit has inputs coupled to the outputs of the multiple sampling stages and changes the logic state of an output signal when no glitches are detected in the samples of the input signal. A control circuit selectively varies a time period used by the filter for sampling the input signal.

27 Claims, 8 Drawing Sheets

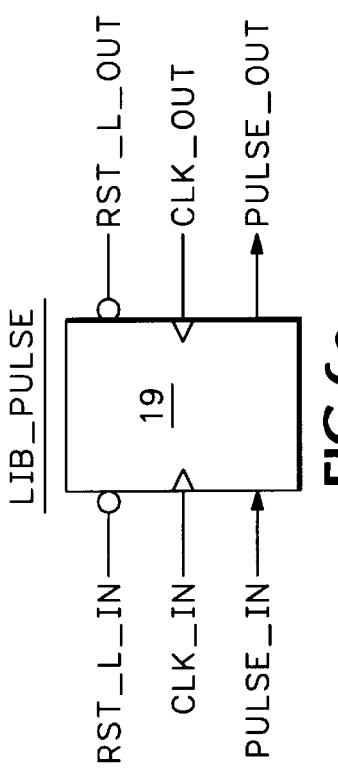
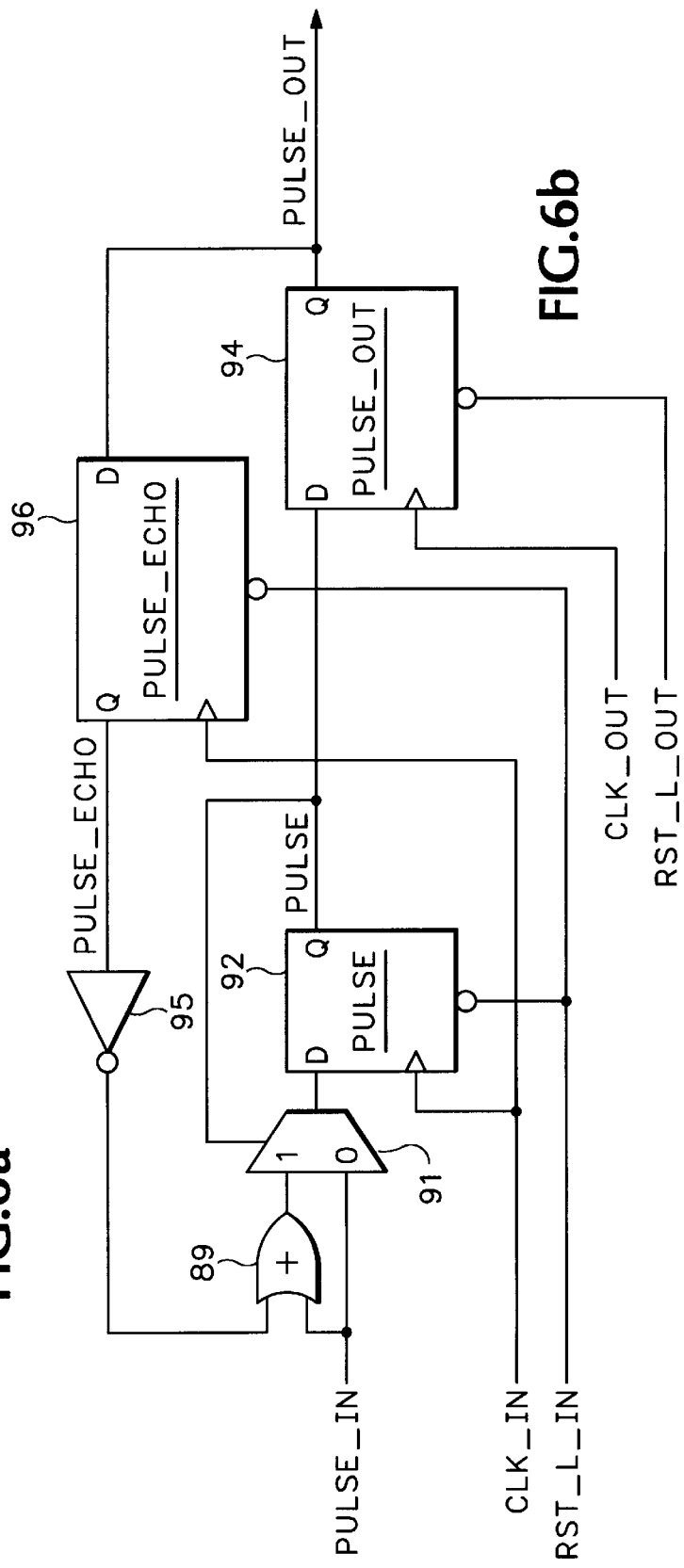

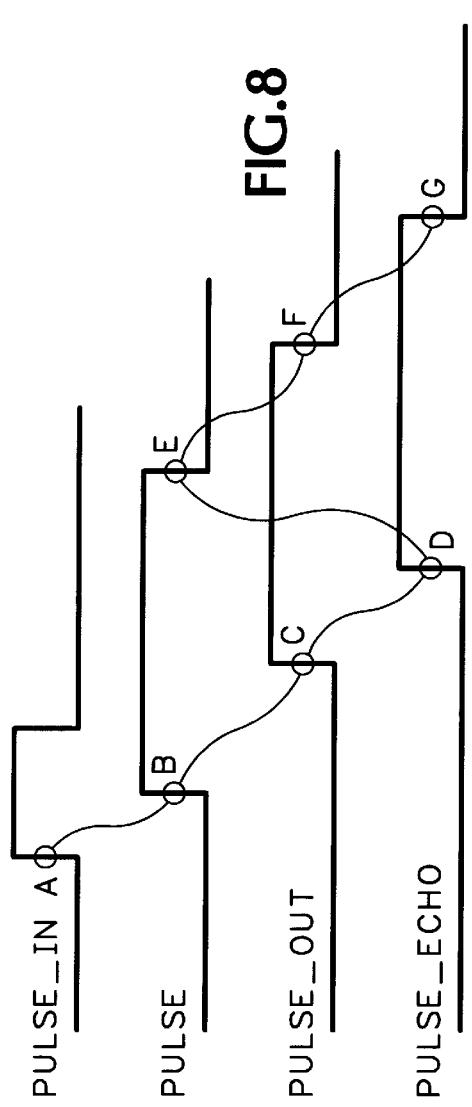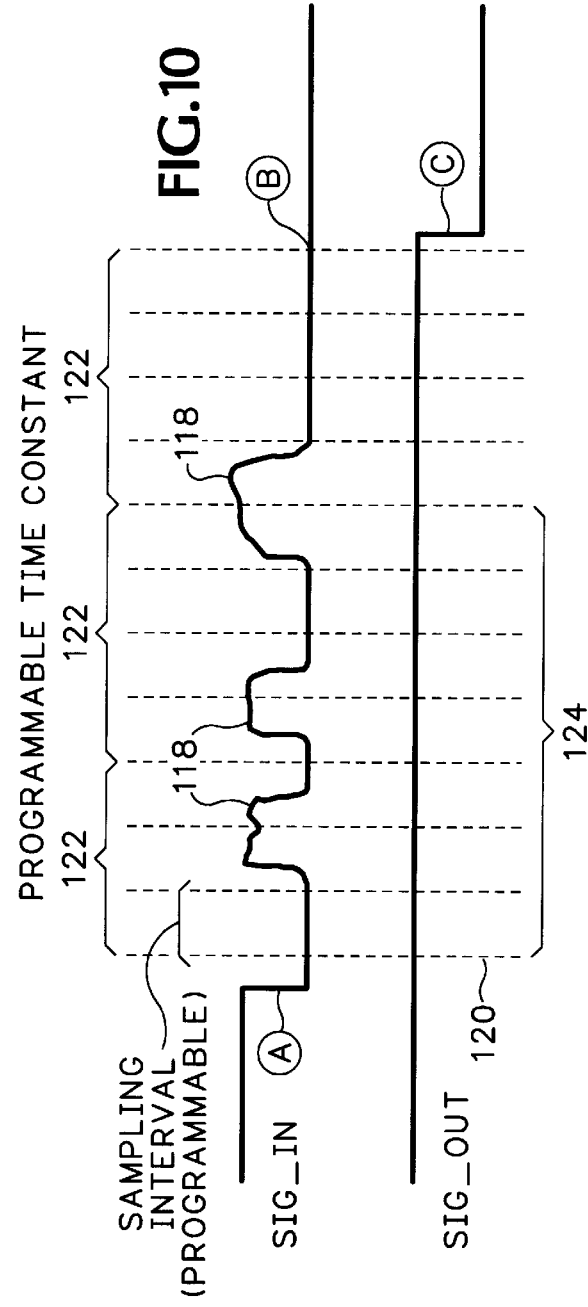

SYSTEM FOR MANAGING SIGNALS IN DIFFERENT CLOCK DOMAINS AND A PROGRAMMABLE DIGITAL FILTER

BACKGROUND OF THE INVENTION

This invention relates to managing signals in different clock domains and more particularly to a low gate count synchronizer circuit. This invention also relates to a low gate count programmable low-pass filter circuit.

Different clock signals are used to control different digital components on a circuit board. The different clock signals might operate in different clock domains. Clock signals operate in different clock domains when the clock signals are generated from independent sources. For example, a system clock might be generated from a clock circuit that is connected externally to a circuit board. A second reference clock might be generated locally on the circuit board with a crystal oscillator. The clock sources generate data signals that operate in different clock domains. The information that is to be passed between the two clock domain may be the data which is synchronized to the first clock, or the occurrence of the first clock itself.

Synchronizer circuits are used to prevent metastable conditions in devices that receive signals in different clock domains. The synchronizer circuits are located at each device requiring synchronization and typically synchronize the data to the clock signal driving the device. Complex synchronizer circuitry is necessary since a separate synchronizer circuit is needed for each device that requires synchronization and for each data line of each device.

Electrical lines often contain noise that can be mistakenly interpreted by digital circuitry as valid data. For example, network routers receive multiple network lines each carrying different signals. The signals on the network lines can be compromised by cross-talk and other noise conditions. If the noise is inadvertently processed as valid data, the router generates the wrong results or locks up.

Digital low pass filters can be used to remove noise from external serial data and clock lines. A standard circuit for filtering noise or "glitches" from a signal uses a counter that is run off a system clock. When an input signal is asserted, the counter samples the input signal at the system clock rate. A comparator compares the counter value to a predetermined threshold value. When the counter value reaches the threshold value, the comparator generates an output signal representing a filtered equivalent of the input signal. These filter circuits require 10–20 bit counters for each data bit and only work off one edge of the input signal. Thus, the filter circuitry is complex, has limited accuracy and requires a large number of data lines.

Noise often has different frequencies and amplitude characteristics in different operating environments. A low pass filter might be effective at removing noise having one type of frequency or amplitude characteristic but ineffective at filtering noise having another frequency or amplitude characteristic. Digital circuitry also has different sensitivity to signal noise. For example, one digital circuit may not be effected by small glitches in an input signal while another digital circuit might reboot from the same glitch. Therefore, some input signals require more rigorous filtering than other input signals.

Accordingly, a need remains for a simple synchronizer circuit that converts data and clock signals into different clock domains and a simple digital filter that can be programmed for different operating conditions.

SUMMARY OF THE INVENTION

A synchronizer circuit manages signals in different clock domains by converting clock signals into pulses or "ticks". The pulses are generated according to a logic condition, such as a rising edge, that occurs in a first clock signal. The pulses are synchronized with a second clock signal operating in a second clock domain. Each pulse or "tick" is equivalent to a clock cycle of the first clock signal. If the frequency of the first clock signal is lowered, the pulses are generated less frequently. Digital circuitry is then driven at the frequency of the first clock and in the time domain of the second clock. This is achieved by using the pulses generated by the synchronizer circuit as clock enables while at the same time clocking the digital circuitry with the second clock signal. A hand-shaking protocol prevents the synchronizer circuit from going into a metastable condition while passing the first clock signal or data signal into a different time domain.

The synchronizer circuit includes a first stage that detects and latches the clock or data signal. A second stage generates clock pulses or data pulse corresponding with the first clock signal and synchronized with the second clock signal. A feedback circuit is coupled between the first stage and the second stage. The feedback circuit resets the first stage by using the output signal generated in the second stage. A multiplexer provides selective pulse generation from the synchronizer circuit.

In one embodiment of the invention, the synchronizer circuit is used in combination with a frequency measurement circuit for measuring the frequency of different external clock signals. The synchronizer circuit converts the external clock signals and a reference clock signal into clock pulses synchronized with a router system clock. The frequency measurement circuit then uses the pulses in different frequency modes to calculate the frequency of the network clock signals.

A programmable digital filter removes noise for data and clock signals. The digital filter includes multiple sampling stages that sample an input signal at multiple time intervals. A detection circuit is coupled to the sampling stages and changes the logic state of an output signal only when no noise is detected in the input signal. A control circuit is coupled to the sampling stages and selectively varies the time interval used by the filter for sampling the input signal.

The control circuit includes a multiplexer having multiple inputs each coupled to a different clock signal. The clock signal selected determines the selectable time interval used by the filter for detecting glitches having a different clock frequency. A synchronizer circuit is used to convert the different clock signals into clock pulses. The clock pulses are generated at the frequency of the selected clock signal and are synchronized with a system clock used for clocking the sampling stages. The pulses are used for enabling the sampling stages thereby selectively changing the time interval between each filter sample.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6A is a block diagram of data synchronizer circuit according to another embodiment of the invention.

FIG. 6B is a detailed block diagram of the data synchronizer circuit shown in FIG. 6A.

FIG. 8 is a timing diagram for the data synchronizer circuit in FIG. 6.

FIG. 10 is a timing diagram for the low-pass filter circuit shown in FIG. 9.

DETAILED DESCRIPTION

Figure 1:
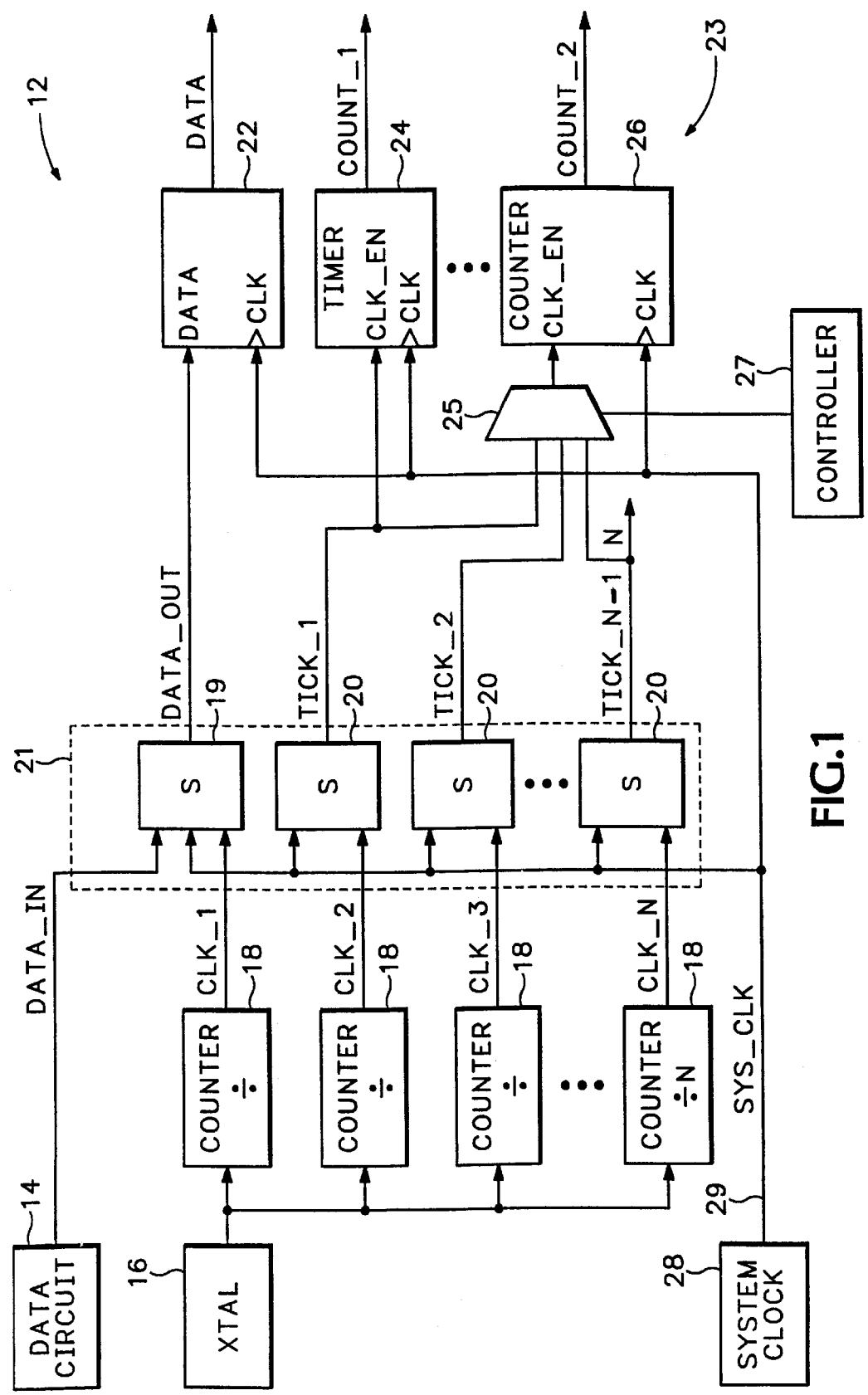
FIG. 1 is a schematic diagram of a clock management system according to one embodiment of the invention.

Referring to FIG. 1, a clock management system 12 includes a first clock generation circuit 16 that generates one or more clock signals in a first clock domain. A second clock generation circuit 28 generates a second system clock signal in a second clock domain independently from the first clock generation circuit 16. In one embodiment, the first clock generation circuit comprises a crystal oscillator and the second clock generation circuit 28 comprises an external clock circuit coupled to the clock management system 12 with an external clock line 29.

The output from crystal oscillator 16 is coupled to multiple counters 18 that divide the oscillator base frequency into different lower frequencies. Multiple clock signals (CLK_1, CLK_2, . . . CLK_N) are output from the counters 18 and are each fed into a synchronizer system 21 that includes a data synchronizer circuit 19 and multiple clock synchronizer circuits 20. The synchronizer system 21 receives the system clock SYS_CLK from the clock generation circuit 28 and receives data lines DATA_IN from a data processing element 14. The data processing element 14 represents any data processing device that processes data in one clock domain and requires conversion of the data into another clock domain. The clock synchronizer circuits 20 each generate clock pulses TICK_1, TICK_2. . . . TICK_N-1 at a rate corresponding to the clock frequencies of CLK_2, CLK_3, . . . CLK_N, respectively. The clock pulses are synchronized with the system clock SYS_CLK. The data synchronizer circuit 19 synchronizes data lines DATA_IN with the system clock SYS_CLK. Clock synchronizer circuits 20 are shown in detail in FIG. 2 and data synchronizer circuit 19 is shown in detail in FIG. 6.

Various digital circuitry 23 is coupled to the synchronizer system 21 such as a flip-flop 22, timers/counters 24 and 26 or any other device that requires data or clocks to be converted into a different time domain. Some of the digital circuitry 23 is clocked by the system clock SYS_CLK and enabled according to the pulses generated by synchronizer system 21. Counter 26 includes a multiplexer 25 controlled by a controller 27. The multiplexer 25 in combination with controller 27 allow counter 26 to operate at any one of the frequencies provided by the pulses output from synchronizer system 21.

The pulses TICK_1, TICK_2, . . . TICK_N are routed to any device that requires operation in the SYS_CLK clock domain but at one of the clock frequencies output from counters 18. The data synchronizer circuit 19 converts data signals. The data in one clock domain into the signal DATA_OUT which is synchronized with SYS_CLK.

Figure 2:
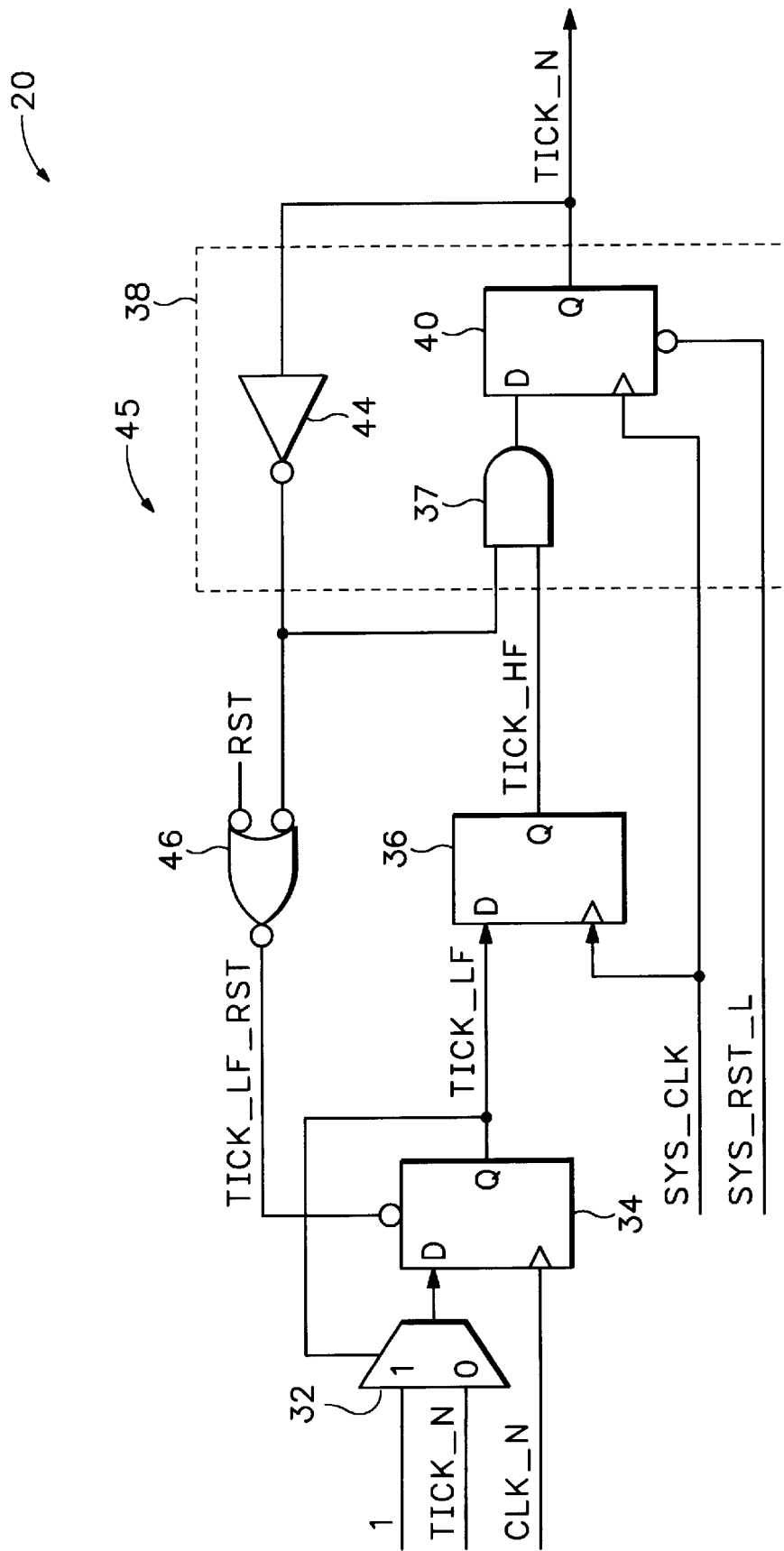
FIG. 2 is a detailed circuit diagram of a clock synchronizer circuit used in the clock management system of FIG. 1.

Referring to FIG. 2, the clock synchronizer circuit 20 (FIG. 1) includes a first flip-flop 34 having a clock input coupled to one of the clock inputs CLK_1, CLK_2, . . . CLK_N, which are referred to generally as CLK_N. A data input is coupled to a multiplexer 32. The multiplexer 32 receives a logic one signal and a TICK_IN signal. The TICK_IN signal is generated from a controller such as controller 27 in FIG. 1. A second flip-flop 36 has a data input coupled to the output of the first flip-flop 34, a clock input coupled to SYS_CLK and an output coupled to a state machine 38. The state machine 38 includes a flip-flop 40 that is clocked by the system clock SYS_CLK and reset by a system reset SYS_RST_L. An invertor 44 feeds the output of flip-flop 40 through an AND gate 37 back to the data input of flip-flop 40. The AND gate 37 logically ANDs the output of flip-flop 40 with the TICK_HF signal output from flip-flop 36.

A feedback circuit 45 is coupled between the output of state machine 38 and the reset input of flip-flop 34. The feedback circuit 45 includes a NOR gate 46 receiving the inverted output from flip-flop 40 and a reset signal RST for manually resetting the clock synchronizer circuit 20.

Operation

The clock synchronizer circuit 20 in FIG. 2 operates in the following manner. The multiplexer 32 provides selective control over the pulses output from the clock synchronizer circuit 20. TICK_IN can be used to selectively choose the clock edges of CLK_N. When TICK_IN=1, a one pulse at TICK_N will be generated for every clock edge of CLK_N. Alternatively, TICK_IN may be connected to a clock—enable signal that is one CLK_N period in length. Then one pulse will be generated at TICK_N that can be used for a clock—enable in the SYS_CLK domain. Thus, when TICK_IN=1, the synchronizer circuit 20 converts clock information from one clock domain to another. When TICK_IN=clock—enable, the synchronizer circuit converts clock—enables from one domain to another.

The rising edge of CLK_N drives the Q output of flip-flop 34 to a logic one. The logic one from the Q output of flip-flop 34 is fed back to the input of multiplexer 32 locking the output of flip-flop 34 both to a logic one. The logic one output from flip-flop 34 (TICK_LF) propagates to the D input of flip-flop 36. Flip-flop 36 is clocked by the system clock signal SYS_CLK and generates the TICK_HF signal. Flip-flop 36 converts TICK_LF into the SYS_CLK time domain. Since CLK_N and SYS_CLK are generated in different clock domains, the flip-flop 36 might be metastable. In the metastable condition, the logic one on the TICK_LF signal might or might not be caught on the next rising edge of SYS_CLK. State machine 38 in combination with the feedback circuit 45 prevent the flip-flop 36 from missing a logic change for TICK_LF.

Figure 3A:
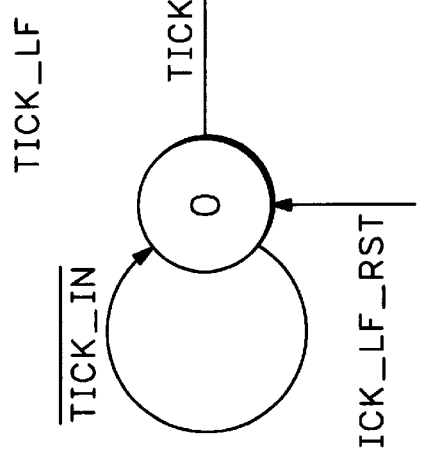
FIGS. 3A and 3B are state diagrams for the clock synchronizer circuit shown in FIG. 2.

Referring to FIGS. 2 and 3A, the state machine 38 starts off in state zero-zero when TICK_HF has not yet been asserted. When TICK_HF changes to a logic one, the state machine 38 goes to state one generating a pulse or tick signal TICK_N. One clock pulse of SYS_CLK later, the state machine 38 goes back to state zero, driving TICK_N to zero. TICK_N stays at state zero while TICK_HF is logic zero.

Figure 3B:
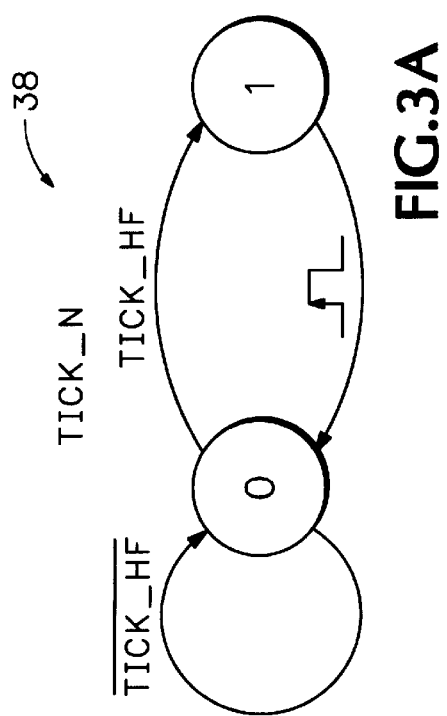

Referring to FIG. 3B, the TICK_N pulse generated by state machine 38 is fed back to flip-flop 34. The state machine 38 acknowledges to the old clock domain CLK_N that the signal change on CLK_IN was detected in the new clock domain SYS_CLK. The acknowledgement comprises resetting flip-flop 34 with the TICK_LF_RST pulse activated by the output from the state machine 38. The flip-flop 34 is reset to a logic zero on the falling edge of TICK_LF_RST. Thus, the synchronizer unit 21 is assured of not missing a clock cycle in CLK_N. The flip-flop 34 stays in a zero state until TICK_IN changes to a logic one and then stays in the logic one state until the next falling edge of TICK_LF_RST. In one embodiment of the invention, the input clock from the lower frequency domain must be at least one quarter of the frequency of the higher frequency clock used in the output clock domain.

Figure 4:
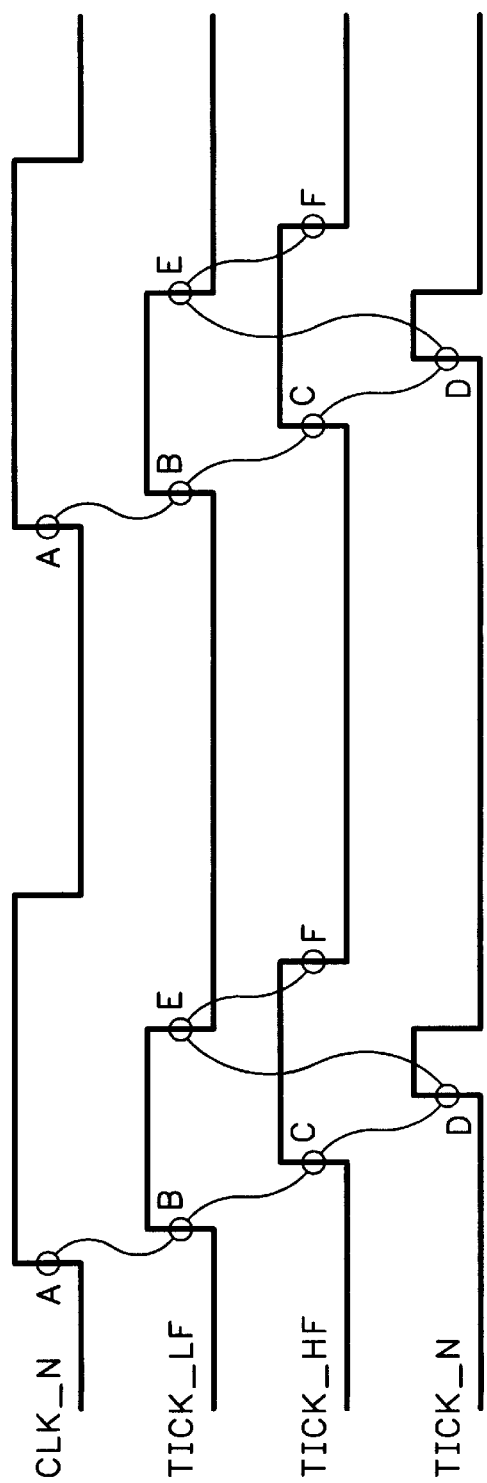
FIG. 4. is a timing diagram for the clock synchronizer circuit shown in FIG. 2.

FIG. 4 is a timing diagram for the clock synchronizer circuit 20 in FIG. 2. Referring to FIG. 2 and 4, the CLK_N signal goes high at time A. If TICK_IN is high, flip-flop 34 drives TICK_LF high at time B. TICK_LF if fed back to the D input, latching the Q output of flip-flop 34 high. At the next rising edge of SYS_CLK, flip-flop 36 drives TICK_HF high at time C. When TICK_HF goes high, the state machine 38 drives TICK_N high at time D. When TICK_N goes high, flip-flop 34 is reset through feedback circuit 45 causing TICK_LF to go low at time E. The low condition of TICK_LF causes flip-flop 36 to drive TICK_HF low on the next rising edge of SYS_CLK at time F. Thus, one clock pulse (tick) is generated in the SYS_CLK domain for each rising edge of CLK_N.

Figure 5:
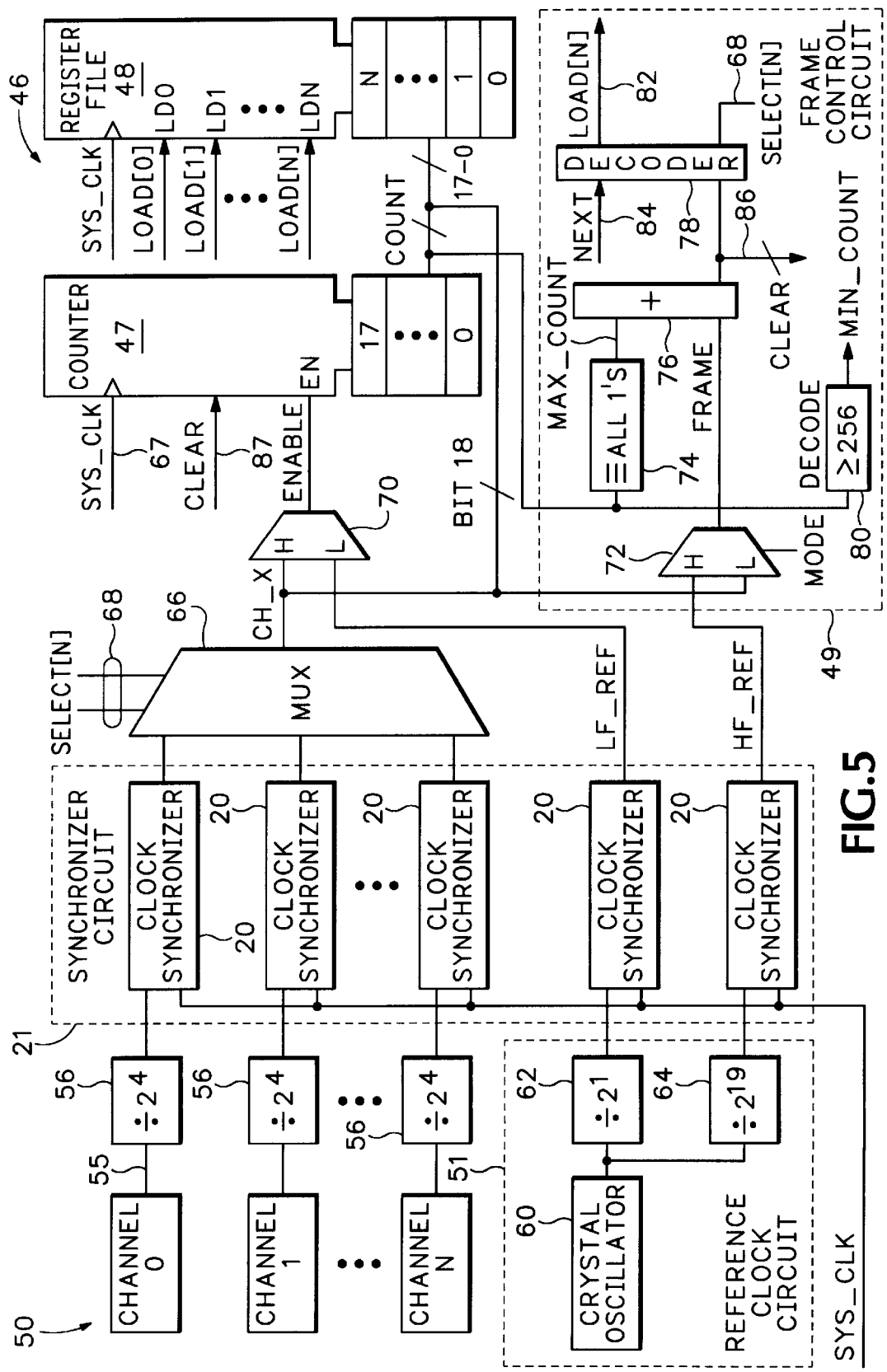
FIG. 5 is one embodiment of the clock management system used in combination with a frequency measurement circuit.

FIG. 5 is one example of how the clock synchronizer circuits 20 are used in a frequency measurement circuit 46. The frequency measurement circuit 46 is described in detail in U.S. patent application Ser. No. 08/908,530, filed Aug. 7, 1997, which has issued as U.S. Pat. No. 5,930,294 on Jul. 27, 1999 entitled: Frequency Measurement Circuit and is herein incorporated by reference. One or more external clock lines 55 are coupled to the frequency measurement circuit 46 through different channels 50. The synchronizer system 21 is coupled to each external clock line 55 and coupled to outputs from reference clock circuit 51 through frequency divider circuits 56, 62 and 64. Multiple clock synchronizer circuits 20 in synchronizer system 21 synchronize the outputs from counters 56, 62 and 64 with a system clock SYS_CLK.

The reference clock circuit 51 includes a crystal oscillator 60 that is converted into a low frequency mode reference clock signal LF_REF by the frequency divider 62 in combination with one of the clock synchronizer circuits 20. The LF_REF signal is coupled through a multiplexer 70 to counter 47. A frequency divider 64 in combination with one of the clock synchronizer circuit 20 converts the output from crystal oscillator 60 into a high frequency mode reference clock signal HF_REF. The HF_REF signal is coupled to a multiplexer 72. The frequency of LF_REF is magnitudes faster than HF_REF. For example, the frequency of LF_REF is 2^18 times faster than HF_REF.

A multiplexer 66 selectively couples one of the external clock signals CH_X to the multiplexer 70 and to the multiplexer 72. Select lines 68 are incremented by a control circuit (not shown) and continuously sequenced through each of the external clock lines 55. Multiplexer 70 couples CH_X to the counter 47 during a high frequency mode and couples LF_REF to the counter 47 during a low frequency mode. Multiplexer 72 couples HF_REF to a frame control circuit 49 during the high frequency mode and couples CH_X to the frame control circuit 49 during the low frequency mode.

Count values from counter 47 are fed into register file 48. An OR gate 76 receives the output from an AND gate 74 and the frame pulse or tick generated from the clock synchronizer circuit 21. A "clear" signal from OR gate 76, a "next" signal 84 from a mode control circuit (not shown), and select lines 68 from the mode control circuit are coupled to a decoder 78. The decoder 78 drives "load" lines 82 that control when count values from counter 47 are loaded into different registers in register file 48. A decode circuit 80 compares the count value output from counter 47 with a preselected minimum count value.

The synchronizer system 21 converts both the clocks signals from the channels 50 and the clock signals from oscillator circuit 51 into pulses or ticks in the SYS_CLK clock domain. The pulses are used to both enable the counter 47 and to drive control logic in frame control circuit 49.

Pulse Translator

Referring to FIG. 6A, event information may have to be converted from one clock domain to another clock domain. For example, a frame sync signal may be represented by multiple clock pulses. The frame sync event might have to be converted to a single event in another clock domain. FIG. 6A is a diagram of a data synchronizer circuit 19 according to another embodiment of the invention that converts data from one clock domain to another.

The synchronizer circuit 19 accepts a strobe PULSE_IN from clock domain CLK_IN and outputs pulse PULSE_OUT in another clock domain CLK_OUT. Either clock domain may be a higher frequency. The input pulse PULSE_IN will never be doubled counted or missed. The output pulse PULSE_OUT will never be shorter than the input pulse PULSE_IN.

Figure 7A:
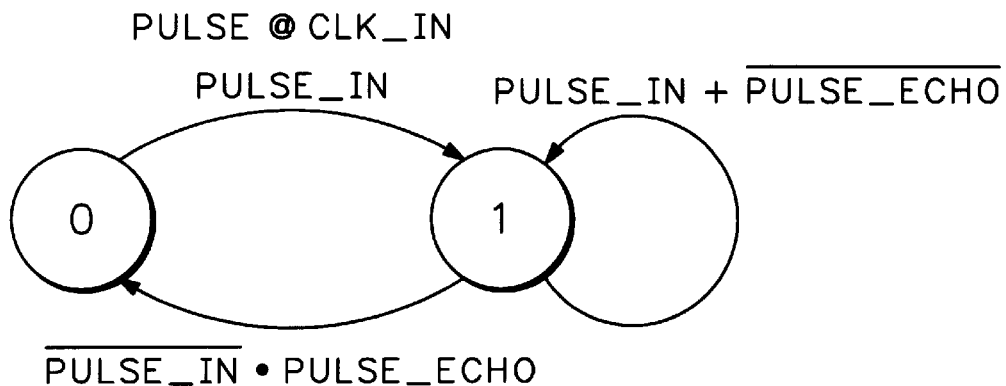
FIGS. 7A–7C are state diagrams for the data synchronizer circuit in FIG. 6.
Figure 7B:
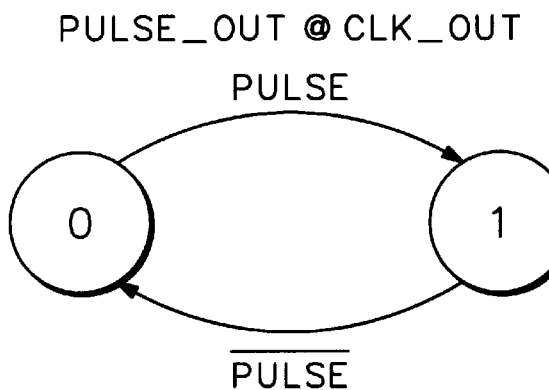
Figure 7C:
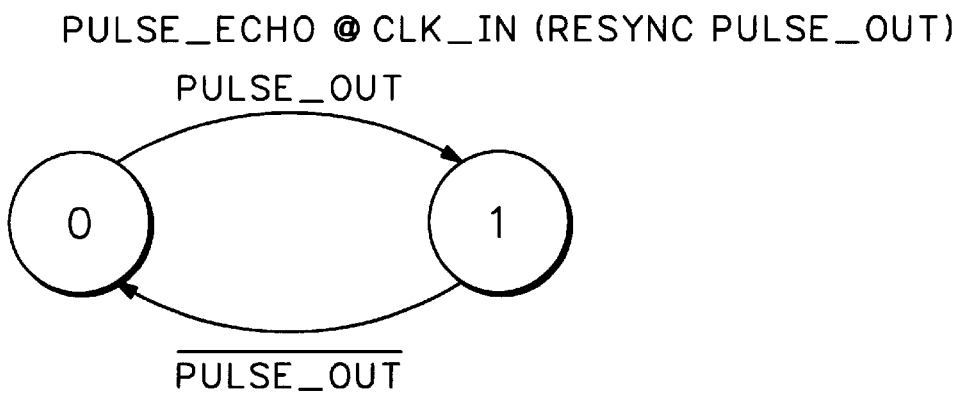

Referring to FIG. 6B, the data synchronizer circuit 19 includes flip-flops 92, 94 and 96. The PULSE_IN signal is coupled though an OR gate 89 and a multiplexer 91 to the data input of flip-flop 92. An output signal PULSE of flip-flop 92 drives the data input of flip-flop 94 and multiplexer 91. An output signal PULSE_OUT of flip-flop 94 drives the data input of flip-flop 96. An output signal PULSE_ECHO of flip-flop 96 is inverted by an invertor 95 and then fed back through gate 89 and multiplexer 91 to flip-flop 92. The clock signal CLK_IN from a first clock domain drives the clock inputs of flip-flops 92 and 96. The clock signal CLK_OUT from a second clock domain drives the clock input of flip-flop 94. A first reset line RST_L_IN resets flip-flops 92 and 96 and a second reset line RST_L_OUT resets flip-flop 94. FIGS. 7A–7C, represent the state diagrams for flip-flops 92, 94, and 96, respectively. FIG. 7A shows the state diagram for flip-flop 92 which changes from state zero to state one when the signal PULSE_IN is driven high. Flip-flop 92 stays in state one if PULSE_IN remains high or while the signal PULSE_ECHO from flip-flop 96 remains low. If PULSE_IN goes low and PULSE_ECHO is asserted high, the flip-flop 92 changes back into state zero. FIG. 7B shows the state diagram for flip-flop 94. When the signal PULSE goes high and on the rising edge of clock signal CLK_OUT, flip-flop 94 changes from state zero to state one. When the signal PULSE goes low, the flip-flop 94 changes back to state zero on the next rising edge of CLK_OUT. FIG. 7C shows the state diagram for flip-flop 96. When the signal PULSE_OUT is asserted high, flip-flop 96 changes from state zero to state one, asserting PULSE_ECHO. When PULSE_OUT goes low, flip-flop 96 changes back to the zero state deasserting PULSE_ECHO on the next rising edge of CLK_IN.

FIG. 8 shows the timing diagram for the data synchronizer circuit shown and described in FIGS. 6 and 7. PULSE_IN is generated in the clock domain of clock signal CLK_IN.

The rising edge of PULSE_IN at time A causes PULSE to go high at time B. When PULSE goes high, PULSE_OUT goes high at time C. PULSE_OUT is synchronized with CLK_OUT.

PULSE_ECHO is asserted high at time D, some time after PULSE_OUT goes high. PULSE_ECHO is used as an acknowledgement back to flip-flop 92 that PULSE_IN was detected and transferred into the second clock domain. When PULSE_ECHO is asserted at time D and PULSE_IN is deasserted, PULSE is deasserted at time E. PULSE_IN must be deasserted before PULSE_OUT is deasserted to prevent double counting of PULSE_IN. Once PULSE is deasserted at time E, PULSE_OUT is deasserted at time F and, in turn, PULSE_ECHO is deasserted at time G.

Low-Pass Filter

Figure 9:
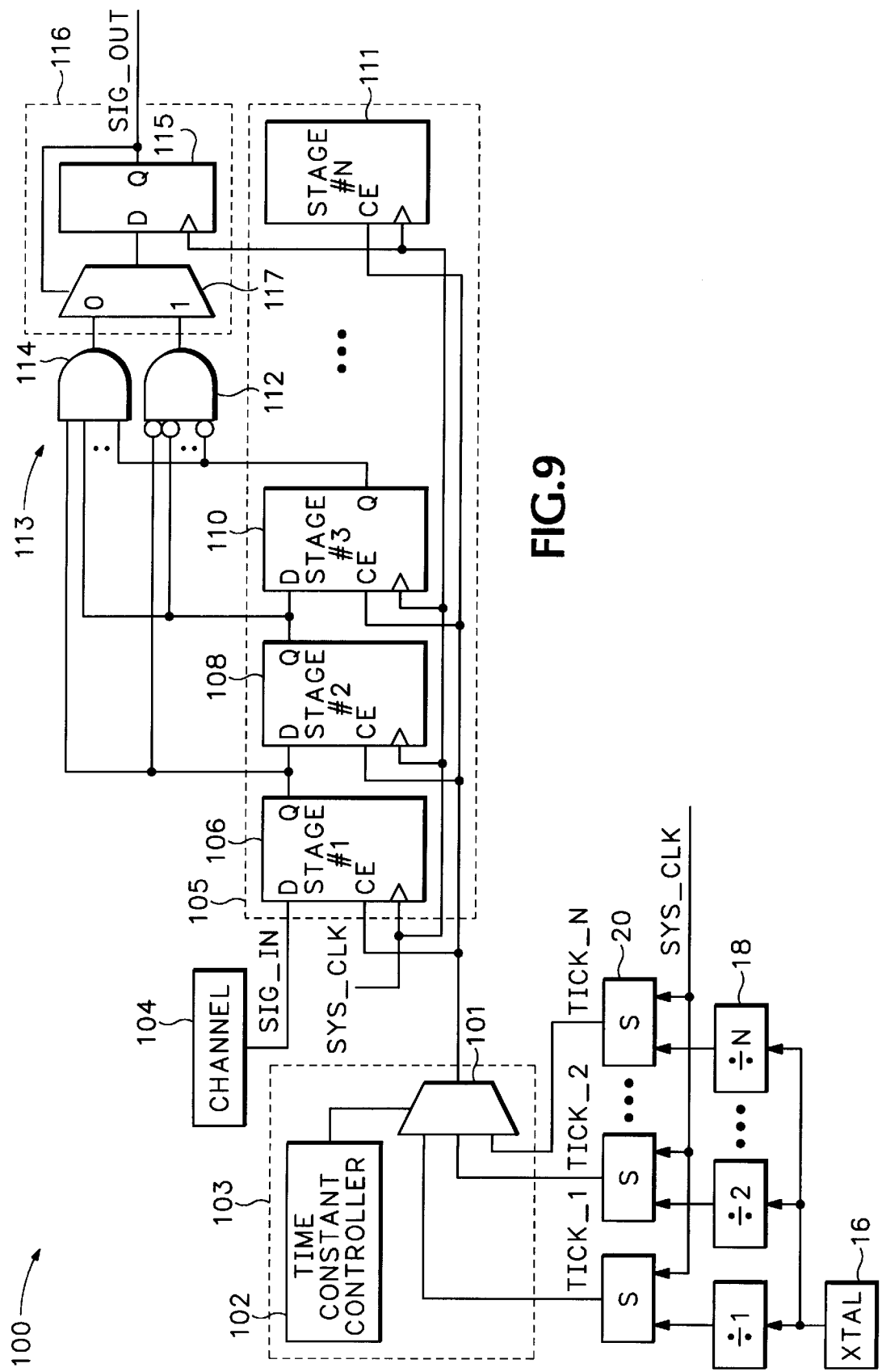
FIG. 9 is a low-pass filter circuit according to another embodiment of the invention using the clock synchronizer circuit shown in FIG. 2.

FIG. 9 shows a programmable low pass filter circuit 100 according to another embodiment of the invention. Multiple sampling stages 105 are coupled together in series. The sampling stages 105 in one embodiment are implemented with flip-flops 106, 108, 110 and 111. A detection circuit 113 includes AND gates 112 and 114 coupled between the outputs of the multiple sampling stages 105. The gates 112 and 114 are coupled through a multiplexer 117 and into a D input of a D flip-flop 115. Multiplexer 117 and D flip-flop 115 together form a synchronous S-R flip-flop 116 that generates a filtered output signal SIG_OUT corresponding to the input signal SIG_IN.

A control circuit 103 includes a multiplexer 101 having multiple inputs coupled to different clock signals TICK_1, TICK_2, TICK_N each having a different frequency. The different clock signals are referred to collectively as TICK_N. A time constant controller 102 is coupled to the multiplexer 101 and selectively couples the different clock signals TICK_N to the multiple sampling stages 105. A crystal oscillator 16 generates a base clock frequency that is divided into different clock frequencies by frequency divider circuit 18. Clock synchronizer circuits 20 are coupled between the different frequency divider circuits 18 and the multiplexer 101. The clock synchronizer circuits 20 are shown in detail in FIG. 2. A system clock SYS_CLK is coupled to both the clock synchronizer circuits 20 and the sampling stages 105.

The control circuit 103 selectively varies the sampling time interval used for detecting and filtering noise or glitches from the input signal SIG_IN. The time constant controller 102 selects one of the clock signal frequencies output from clock synchronizer circuits 20 for driving the sampling stages 105. The clock synchronizer circuit 20 for the selected clock frequency generates clock pulses synchronized with SYS_CLK as described above in FIG. 2. The clock pulses enable each flip-flop 106, 108, 110 and 111 at the selected clock frequency.

The time constant required for signal SIG_IN to propagate through the flip-flops 106, 108, 110 and 111 varies according to the selected pulse frequency from control circuit 103 and the number of flip-flops in sampling stages 105. For example, a selected pulse frequency coming out of multiplexer 101 of one millisecond, takes SIG_IN three milliseconds (msecs) to propagate through a three flip-flop sampling stage 105. Accordingly, if the frequency of the pulses selected by multiplexer 101 is 100 msecs, SIG_IN will take 300 msecs to propagate through a three flip-flop sampling stage 105.

The detection circuit 113 must see the same logic signal change on each output of each one of the multiple sampling stage 105 before SIG_OUT changes logic states. If all ones are detected on the inputs of AND gate 114, S-R flip-flop 116 is set to a logic one. If the inputs of AND gate 112 are all logic zeros, the S-R flip-flop 116 is reset to a logic zero. If there is a combination of logic ones and zeros at the inputs of either AND gate 112 or AND gate 114, the current logic state of SIG_OUT does not change.

A small time constant (e.g., 3 msecs) would be used if the information on SIG_IN must be processed immediately. A larger time constant could be selected when additional delay in SIG_OUT is not detrimental to the performance of the receiving circuitry. A larger time constant is created by selecting a slower clock frequency from controller 103. A larger time constant is also produced by adding additional flip-flop to the sampling stages 105.

FIG. 10 is a timing diagram for the filter circuit 100 shown in FIG. 9. The signal SIG_IN changes from a logic one to a logic zero at time A. Several glitches 118 occur in SIG_IN. Dashed lines 120 represent sampling intervals taken by the low pass filter 100 shown in FIG. 9. For purposes of discussion, four flip-flops are assumed to comprise the sampling stages 105. The first four sampling intervals in time period 122 detect the logic values zero, zero, one and zero. Therefore, SIG_OUT is not changed at the output of S-R flip-flop 116 (FIG. 9).

The sampled value of SIG_IN for the next sample interval (one) is passed into the first flip-flop 106. The previous three sampled values are propagated to flip-flop 108, 110 and 111. The four sampled values are now one, zero, one and zero. Because the sampled values do not all equal zero, the output signal SIG_OUT remains at a logic one value. At time B the four sampled values of SIG_IN each reach the same zero logic level. Accordingly, SIG_OUT changes from a logic one to a logic zero value at time C.

To double the time period between sampling intervals, a clock signal having one-half the current clock frequency is selected in controller 103. The new time constant 124 is thereby twice the original time constant 122. One application for the low pass filter circuit 100 (FIG. 9) is in network routers to remove noise, such as cross-talk, that occurs between adjacent network lines. The low pass filter uses a low number of gates. Therefore, the low pass filter circuits 100 can be used on a larger number of signals with minimal gate impact. By using the clock synchronizer circuits 20, the low pass filter circuit 100 is easier to reprogram to different sampling time intervals. The same outputs from clock synchronizer circuits 20 can also provide clock frequency control for other circuitry, such as the digital circuitry 23 shown in FIG. 1 and the frequency measurement circuit 46 shown in FIG. 5.

To reduce aliasing errors, the number of flip-flops used in the sampling stages 105 is increased. By using more flip-flops, more samples are taken before the low pass filter makes a decision whether to change SIG_OUT. Thus, the accuracy of the low-pass filter in detecting noise is improved by increasing the number of the sampling stages 105.

Having described and illustrated the principles of the invention in a preferred embodiment thereof, it should be apparent that the invention can be modified in arrangement and detail without departing from such principles.

We claim all modifications and variation coming within the spirit and scope of the following claims:

1. A system for managing signals in different clock domains, comprising:
   a synchronizer circuit including inputs for receiving a first clock signal in a first clock domain from a first clock generation circuit and receiving a second clock signal in a second clock domain from a second clock generation circuit and an output, the synchronizer circuit receiving an input signal in the first clock domain and generating an output signal in the second clock domain that corresponds to the input signal; and the synchronizer circuit output signal comprising clock pulses generated at a frequency of the first clock signal and output as a chip enable for digital circuitry having a first clock input coupled to the second clock signal.

2. A system according to claim 1 wherein the synchronizer circuit outputs a data signal and the second input of the digital circuitry comprises a data input driven by the data signal.

3. A system according to claim 1 wherein the first clock generation circuit comprises a crystal oscillator coupled to multiple counters, each one of the counters generating a different clock signal frequency in the first clock domain.

4. A system according to claim 3 including multiple synchronizer circuits each having a first input coupled to an associated one of the multiple counters, a second input coupled to the second clock generation circuit and an output generating clock pulses in the second clock domain corresponding to the clock signal frequency output by the associated one of the multiple counters.

5. A system according to claim 4 including a multiplexer coupled between the output of the multiple synchronizer circuits and the digital circuitry, the multiplexer selectively changing an operating frequency for the digital circuitry.

6. A system according to claim 1 including a feedback circuit coupled across the synchronizer circuit, the feedback circuit resetting the clock pulses only after the synchronization circuit latches the first clock signal with the second clock signal.

7. A system for managing signals in different clock domains, comprising:

a first clock generation circuit generating at least a first clock signal in a first clock domain;

a second clock generation circuit generating a second clock signal in a second clock domain independently from the first clock signal;

a synchronizer circuit including inputs coupled to both the first clock generation circuit and the second clock generation circuit and an output, the synchronizer circuit receiving an input signal in the first clock domain and generating an output signal in the second clock domain that corresponds to the input signal; and digital circuitry having a first clock input coupled to the second clock signal and a second input coupled to the output of the synchronizer circuit;

wherein the synchronizer circuit outputs clock pulses corresponding to a frequency of the first clock signal and the second input of the digital circuitry comprises a chip enable driven by the clock pulses output from the synchronizer circuit.

8. A system according to claim 7 wherein the digital circuitry comprises a low pass filter having multiple sampling stages, each one of the multiple sampling stages enabled according to the clock pulses generated by the synchronization circuit.

9. A system for managing signals in different clock domains, comprising:

a first clock generation circuit generating at least a first clock signal in a first clock domain;

a second clock generation circuit generating a second clock signal in a second clock domain independently from the first clock signal;

a synchronizer circuit including inputs coupled to both the first clock generation circuit and the second clock generation circuit and an output, the synchronizer circuit receiving an input signal in the first clock domain and generating an output signal in the second clock domain that corresponds to the input signal;

digital circuitry having a first clock input coupled to the second clock signal and a second input coupled to the output of the synchronizer circuit;

a feedback circuit coupled across the synchronizer circuit, the feedback circuit acknowledging conversion of the input signal into the second clock domain;

the synchronizer circuit including:

a first flip-flop having a clock input coupled to the first clock generating circuit, a reset input coupled to the feedback circuit, and an output;

a second flip-flop having a data input coupled to the output of the first flip-flop, a clock input coupled to the second clock generating circuit and an output; and a state machine having a data input coupled to the output of the second flip flop, a clock input coupled to the second clock generating circuit and an output coupled to both the feedback circuit and the digital circuitry.

10. A system according to claim 9 wherein the output of the first flip-flop is coupled back to the data input of the first flip-flop.

11. A system for managing signals in different clock domains, comprising:

a first clock generation circuit generating at least a first clock signal in a first clock domain;

a second clock generation circuit generating a second clock signal in a second clock domain independently from the first clock signal;

a synchronizer circuit including inputs coupled to both the first clock generation circuit and the second clock generation circuit and an output, the synchronizer circuit receiving an input signal in the first clock domain and generating an output signal in the second clock domain that corresponds to the input signal;

digital circuitry having a first clock input coupled to the second clock signal and a second input coupled to the output of the synchronizer circuit; and a pulse enable circuit coupled to the synchronizer circuit input for selectively enabling pulse generation from the synchronizer circuit.

12. A system for managing signals in different clock domains, comprising:

a first clock generation circuit generating at least a first clock signal in a first clock domain;

a second clock generation circuit generating a second clock signal in a second clock domain independently from the first clock signal;

a synchronizer circuit including inputs coupled to both the first clock generation circuit and the second clock generation circuit and an output, the synchronizer circuit receiving an input signal in the first clock domain and generating an output signal in the second clock domain that corresponds to the input signal;

digital circuit having a first clock input coupled to the second clock signal and a second input coupled to the output of the synchronizer circuit;

an external network clock line coupled to the synchronizer circuit having a third clock signal in a third clock domain; and a frequency measurement circuit coupled to the synchronizer circuit and the second clock generation circuit for measuring clock signal frequencies of the external network clock lines according to pulses generated by the synchronizer circuit.

13. A system according to claim 12 wherein the frequency measurement circuit includes the following:

a counter circuit generating a clock count value according to one of the first clock signal and third clock signal; and a frame control circuit generating a time frame signal according to one of the first clock signal and third clock signal, the time frame signal used in combination with the clock count value for measuring a frequency for the third clock signal.

14. A synchronizer circuit, comprising:

a first stage receiving a first clock signal in a first clock domain, the first stage detecting and latching an input signal according to the first clock signal;

a second stage coupled to the first stage and receiving a second clock signal generated in a second clock domain, the second stage generating an output signal comprising pulses generated at a frequency corresponding to the first clock signal and synchronized with the second clock signal, the pulses output for enabling circuitry clocked by the second clock signal; and a feedback circuit coupled between the first stage and the second stage, the feedback circuit resetting the first stage only after the second stage latches the input signal using the second clock signal.

15. A circuit according to claim 14 wherein the first stage comprises a first flip-flop and the second stage comprises a state machine having a data input coupled to the output of the first flip-flop.

16. A circuit according to claim 14 including a third stage coupled between the first and second stage and receiving the second clock signal.

17. A circuit according to claim 14 including a multiplexer having a first input coupled to a pulse control signal, a second input coupled to the output of the first stage and an output coupled to a data input on the first stage.

18. A synchronizer circuit, comprising:

a first stage receiving a first clock signal in a first clock domain, the first stage detecting and latching an input signal according to the first clock signal;

a second stage coupled to the first stage and receiving a second clock signal generated in a second clock domain, the second stage generating an output signal corresponding to the input signal and synchronized with the second clock signal; and a feedback circuit coupled between the first stage and the second stage, the feedback circuit resetting the first stage according to the output generated by the second stage, the feedback circuit comprising a flip-flop having an input coupled to the output of the second stage, a clock input coupled to the first clock signal and an output coupled to the first stage.

19. A method for managing clock signals in different clock domains, comprising:

receiving a first clock signal;

latching an input signal according to the first clock signal;

converting the latched input signal into a second clock domain synchronized with a second clock signal;

generating an output signal from the synchronized input signal;

resetting the latched input signal according to the output signal thereby verifying conversion of the latched input signal into the second clock domain;

latching the input signal when a rising edge occurs on the first clock signal;

generating a clock pulse for each rising edge of the first clock signal that is synchronized with the second clock signal; and enabling a digital circuit with the clock pulses while at the same time clocking the digital circuit with the second clock signal.

20. A programmable digital filter, comprising:

multiple sampling stages having a data input for receiving an input signal and multiple outputs generating samples of the input signal at incremental time periods;

a detection circuit coupled to the outputs of the multiple sampling stages and generating an output signal according to the samples;

a control circuit coupled to the multiple sampling stages, the control circuit selectively varying a time duration between the samples taken by the multiple sampling stages; and a synchronizer circuit coupled to the control circuit that generates clock pulses at a frequency corresponding to an input clock signal and synchronized with a system clock signal, the clock pulses enabling the multiple sampling stages and the system clock clocking the multiple sampling stages.

21. A digital filter according to claim 20 wherein the control circuit includes the following:

multiple clock generation circuits each generating different clock signal having a different frequency; and a selection circuit coupled between the multiple clock generation circuits and the multiple sampling stages for selectively coupling any one of the different clock signals to the multiple sampling stages.

22. A programmable digital filter, comprising:

multiple sampling stages having a data input for receiving an input signal and multiple outputs generating samples of the input signal at incremental time periods;

a detection circuit coupled to the outputs of the multiple sampling stages and generating an output signal according to the samples, the detection circuit comprising the following:

a first logic circuit detecting a common logic high state on the outputs of the multiple sampling stages;

a second logic circuit detecting a common logic low state on the outputs of the multiple sampling stages; and a third logic circuit having inputs coupled to both the first and second logic circuit and an output generating the output signal; and a control circuit coupled to the multiple sampling stages, the control circuit selectively varying a time duration between the samples taken by the multiple sampling stages.

23. A digital filter according to claim 22 wherein the multiple sampling stages each comprise a flip-flop.

24. A programmable digital filter, comprising:

multiple sampling stages having a data input for receiving an input signal and multiple outputs generating samples of the input signal at incremental time periods;

a detection circuit coupled to the outputs of the multiple sampling stages and generating an output signal according to the samples; and a control circuit coupled to the multiple sampling stages, the control circuit selectively varying a time duration between the samples taken by the multiple sampling stages, the control circuit including the following:
multiple clock generation circuits each generating different clock signal having a different frequency;
a selection circuit coupled between the multiple clock generation circuits and the multiple sampling stages for selectively coupling any one of the different clock signals to the multiple sampling stages;
multiple synchronizer circuits each coupled to an associated one of the multiple clock generation circuits, the synchronizer circuits each comprising the following:
a first stage that detects and latches the clock signal from the associated clock generation circuit;
a second stage coupled to the first stage and receiving a system clock signal;
a third stage coupled to the second stage, the third stage generating a clock pulse according to the clock signal and synchronized with the system clock signal; and
a feedback circuit coupled between the first stage and the third stage, the feedback circuit resetting the first stage according to the clock pulses generated by the third stage.

25. A digital filter according to claim 24 wherein the clock pulses from the multiple synchronizer circuits are coupled to a chip enable input on each one of the multiple sampling stages.

26. A method for filtering an input signal, comprising:
generating samples of an input signal at incremental times that extend over a sample time period;
detecting a value of the input signal at each one of the samples;
generating an output signal that varies when the samples all change to a common value;
selectively varying a time duration between the samples to change the sample time period, the time duration varied by generating clock pulses that correspond to a frequency of a first clock signal, the clock pulses also synchronized with a second clock signal while the clock pulses enable sampling of the input signal at a clock frequency supplied by the second clock signal.

27. A method according to claim 26 wherein the step of varying the sample time period comprises selectively enabling different clock signals each having a different frequency.

* * * * *

UNITED STATES PATENT AND TRADEMARK OFFICE
CERTIFICATE OF CORRECTION

PATENT NO. : 6,175,603 B1
DATED : January 16, 2001
INVENTOR(S) : Chapman, et al.

It is certified that error appears in the above-identified patent and that said Letters Patent is hereby corrected as shown below:

Column 1,
Line 19, "domain" should read -- domains --

Column 4,
Line 32, "clock_" should read -- clock- --
Line 34, "clock_" should read -- clock- --
Line 38, "clock_" should read -- clock- --
Line 39, "clock_" should read -- clock- --

Column 8,
Line 62, "I" should read -- We --

Signed and Sealed this

Sixth Day of November, 2001

Attest:

NICHOLAS P. GODICI
Attesting Officer  Acting Director of the United States Patent and Trademark Office